(12) United States Patent
Shibahara et al.

(10) Patent No.: US 11,101,914 B2
(45) Date of Patent: Aug. 24, 2021

(54) OPTICAL TRANSMISSION SYSTEM AND OPTICAL TRANSMISSION METHOD

(71) Applicant: NIPPON TELEGRAPH AND TELEPHONE CORPORATION, Tokyo (JP)

(72) Inventors: Koki Shibahara, Tokyo (JP); Takayuki Mizuno, Tokyo (JP); Yutaka Miyamoto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/971,856

(22) PCT Filed: Feb. 20, 2019

(86) PCT No.: PCT/JP2019/006293
§ 371 (c)(1),
(2) Date: Aug. 21, 2020

(87) PCT Pub. No.: WO2019/171953
PCT Pub. Date: Sep. 12, 2019

(65) Prior Publication Data
US 2021/0013985 A1     Jan. 14, 2021

(30) Foreign Application Priority Data

Mar. 6, 2018 (JP) .............. JP2018-039672

(51) Int. Cl.
*H04J 14/04* (2006.01)
*H04B 10/2581* (2013.01)
*H04Q 11/00* (2006.01)

(52) U.S. Cl.
CPC .......... *H04J 14/04* (2013.01); *H04B 10/2581* (2013.01); *H04Q 11/0005* (2013.01)

(58) Field of Classification Search
CPC ........ H04J 14/04; H04J 14/02; H04J 14/0212; H04J 14/021; H04B 10/2581;
(Continued)

(56) References Cited

U.S. PATENT DOCUMENTS

2015/0043910 A1* 2/2015 Koebele .................. H04J 14/04
398/44
2016/0043826 A1* 2/2016 Zhou ....................... H04J 14/02
398/44

(Continued)

FOREIGN PATENT DOCUMENTS

JP       2014528216 A     10/2014
JP       2015516738 A      6/2015
(Continued)

OTHER PUBLICATIONS

G.D. Golden, C.J. Foschini, R.A. Valenzuela and P.W. Wolniansky, "Detection algorithm and initial laboratory results using V-BLAST space-time communication architecture", Electronics letters, 1999, vol. 35, No. 1.

(Continued)

*Primary Examiner* — Hanh Phan
(74) *Attorney, Agent, or Firm* — Harness, Dickey & Pierce, P.L.C.

(57) ABSTRACT

An optical transmission system includes a plurality of transmission paths that transmit a mode multiplexing signal, and one or more mode permutation units provided between the transmission paths. The mode permutation unit performs mode permutation to interchange modes to be used between at least some optical signals among respective optical signals of a plurality of types of modes that are multiplexed to the mode multiplexing signal input from the transmission (Continued)

path on an input side, and outputs the mode multiplexing signal subjected to the mode permutation to the transmission path on an output side.

6 Claims, 5 Drawing Sheets

(58) Field of Classification Search
CPC .......... H04B 10/2507; H04Q 11/0066; H04Q 11/0067; H04Q 11/0005; H04Q 11/0062
USPC .... 398/44, 79, 158, 159, 45, 48, 49, 50, 56, 398/82; 385/24, 37, 16, 17, 18, 27, 28, 385/126, 127, 39, 31
See application file for complete search history.

(56) References Cited

U.S. PATENT DOCUMENTS

2017/0195052 A1* 7/2017 Awwad .............. H04B 10/2581
2018/0019817 A1* 1/2018 Rekaya Ben-Othman .................. H04B 10/50

FOREIGN PATENT DOCUMENTS

| JP | 2018146754 A | 9/2018 |
| WO | WO-2013041456 A1 | 3/2013 |
| WO | WO-2013144062 A1 | 10/2013 |

OTHER PUBLICATIONS

International Search Report (in English and Japanese) issued in PCT/JP2019/006293, dated May 7, 2019.

* cited by examiner ial Application No. PCT/JP2019/006293, filed on Feb. 20, 2019, which claims priority to Japanese Application No. 2018-039672, filed on Mar. 6, 2018. The entire disclosures of the above applications are incorporated herein by reference.

TECHNICAL FIELD

The present invention relates to an optical transmission system and an optical transmission method.

BACKGROUND ART

With the recent spread of smartphones, distribution of high-definition video services, development of the Internet of things (IoT) service, and the like, the amount of communication traffic flowing through optical networks keeps increasing year by year. In the optical network, the increasing demand for the communication traffic has hitherto been responded to by the high functionalization of an optical communication system device installed at the terminal of the optical network, the introduction of an optical amplifier and an optical switch, and the like, without changing the structure of optical fiber as a transmission path.

For the optical fiber that has been the basis of the present large-capacity optical network, excluding a local network for short distances such as a local area network (LAN), single-mode fiber has been used. The single-mode fiber is fiber that has a single core to be a path for an optical signal in cladding and supports only a single mode in wavelength bands such as the C band and the L band used in the large-capacity optical network. This has led to realization of a large-capacity optical network that stably transfers information reaching several terabits per second over a long distance.

Further, the digital coherent transmission technique obtained by a combination of the digital signal processing technique and the coherent transmission technique has been introduced into an optical transmission device of 100 gigabits. By using the digital coherent transmission technique, it is possible to retrieve information put independently on each of the amplitude and the phase of an optical carrier wave, and correct waveform distortion generated during the transmission with high accuracy.

As a simple example, polarization multiplexing optical transmission using two modes of orthogonal polarized waves in single-mode fiber will be cited. In the polarization multiplexing optical transmission, different information can be put on each of the polarized waves in the orthogonal relationship. These polarized waves are mixed in complexity in an optical transmission path. The orthogonal axes of these polarization modes fluctuate at high speed and are generally difficult to follow by using an optical device. Therefore, a reception device compatible with the polarization-diversity structure receives a mixed-polarization multiplexing optical signal, converts the received signal to a digital signal, and divides the converted signal by using digital signal processing. The above processing can be modeled as a 2×2 multiple-input multiple-output (MIMO) system that is used in a wireless communication system. Information is taken out of each divided signal for each polarized wave, and the communication is established between a transmitter and the receiver.

As another example, mode multiplexing optical transmission using a plurality of modes in multi-mode fiber will be cited. In the mode multiplexing optical transmission, by spreading a core diameter as compared to that of the single-mode fiber, even in a wavelength band such as the C band, a plurality of modes can be excited and different information can be put on each mode. As in the polarization multiplexing optical transmission, in the case of the mode multiplexing optical transmission as well, mode signals are mixed complexly in an optical signal with multiplexed modes during the propagation through the multi-mode fiber. A reception device compatible with the mode-diversity structure receives the mixed-mode multiplexing optical signal, converts the received signal to a digital signal, and divides the converted signal by using digital signal processing.

Algorithms of the signal division by the digital signal processing described above include spatial filtering, interference cancelling, maximum likelihood decoding, and the like (e.g., see Non-Patent Literature 1).

CITATION LIST

Non-Patent Literature

Non-Patent Literature 1: G. D. Golden, C. J. Foschini, R. A. Valenzuela, and P. W. Wolniansky, "Detection Algorithm and Initial Laboratory Results using V-BLAST space-time communication architecture", Electronics Letters, 1999, vol. 35, No. 1

SUMMARY OF THE INVENTION

Technical Problem

However, there has been a problem that even when a signal is divided using the above algorithm in the digital signal processing, the signal is not sufficiently divided, and an information error occurs due to an influence of mode dispersion.

In view of the above circumstances, an object of the present invention is to provide an optical transmission system and an optical transmission method capable of reducing an information error of an optical signal transmitting through a transmission path by mode multiplexing.

Means for Solving the Problem

One aspect of the present invention is an optical transmission system including: a plurality of transmission paths that transmit a mode multiplexing signal; and one or more mode permutation units provided between the transmission paths. The mode permutation unit performs mode permutation to interchange modes to be used between at least some optical signals among respective optical signals of a plurality of types of modes that are multiplexed to the mode multiplexing signal input from the transmission path on an input side, and outputs the mode multiplexing signal subjected to the mode permutation to the transmission path on an output side.

One aspect of the present invention is the optical transmission system described above including the same number of the mode permutation units as the number of types of the modes. The mode of each of a plurality of the optical signals multiplexed to the mode multiplexing signal is cyclically permutated by a plurality of the mode permutation units.

One aspect of the present invention is the optical transmission system described above, in which the mode permutation unit includes a mode demultiplexing unit that divides into a single mode an optical signal of each of a plurality of types of the modes that are multiplexed to the mode multiplexing signal input from the transmission path on the input side, and a mode multiplexing unit that inputs the optical signal of the single mode from each of the input units corresponding to the plurality of types of the modes, and outputs to the transmission path on the output side a mode multiplexing signal obtained by multiplexing a plurality of the optical signals input from the respective input units by using modes that correspond to the input units. The mode demultiplexing unit outputs each of the divided optical signals to the input unit corresponding to the mode after the mode permutation of the optical signal.

One aspect of the present invention is the optical transmission system described above, in which the mode permutation unit includes a mode demultiplexing unit that divides into a single mode an optical signal of each of a plurality of types of the modes that are multiplexed to the mode multiplexing signal input from the transmission path on the input side, a mode multiplexing unit that inputs the optical signal of the single mode from each of the input units corresponding to the plurality of types of the modes, and outputs to the transmission path on the output side a mode multiplexing signal obtained by multiplexing a plurality of the optical signals input from the respective input units by using modes that correspond to the input units, and a switch unit that outputs each of the plurality of the optical signals divided by the mode demultiplexing unit to the input unit corresponding to the mode after the mode permutation of the optical signal.

One aspect of the present invention is the optical transmission system described above, in which the transmission path is single-core fiber.

One aspect of the present invention is the optical transmission system described above, in which the transmission path is multi-core fiber. The mode permutation unit includes a mode demultiplexing unit that divides into single modes an optical signal of each of a plurality of types of the modes multiplexed to the mode multiplexing signal transmitted through each of a plurality of cores of the multi-core fiber on an input side, a mode multiplexing unit that inputs the optical signal of the single mode from each of input units corresponding to each of combinations of a plurality of cores of the multi-core fiber on an output side and the plurality of types of the modes, generates a mode multiplexing signal obtained by multiplexing the plurality of optical signals input from the respective input units by using modes that correspond to the input units for each of the cores of the multi-core fiber of an output destination, and outputs the generated mode multiplexing signal to the core corresponding to the multi-core fiber on the output side, and a switch unit that outputs each of the plurality of the optical signals divided by the mode demultiplexing unit to the input unit corresponding to the core of an output destination and the mode after the mode permutation.

One aspect of the present invention is an optical transmission method in an optical transmission system that includes a plurality of transmission paths that transmit a mode multiplexing signal, and one or more mode permutation units provided between the transmission paths, the method including a step of the mode permutation unit performing mode permutation to interchange modes to be used between at least some optical signals among respective optical signals of a plurality of types of modes that are multiplexed to the mode multiplexing signal input from the transmission path on an input side, and outputting the mode multiplexing signal subjected to the mode permutation to the transmission path on an output side.

Effects of the Invention

The present invention makes it possible to reduce an information error of an optical signal transmitting through a transmission path by mode multiplexing.

DESCRIPTION OF EMBODIMENTS

Hereinafter, an embodiment of the present invention will be described with reference to the drawings.

First Embodiment

Figure 1:
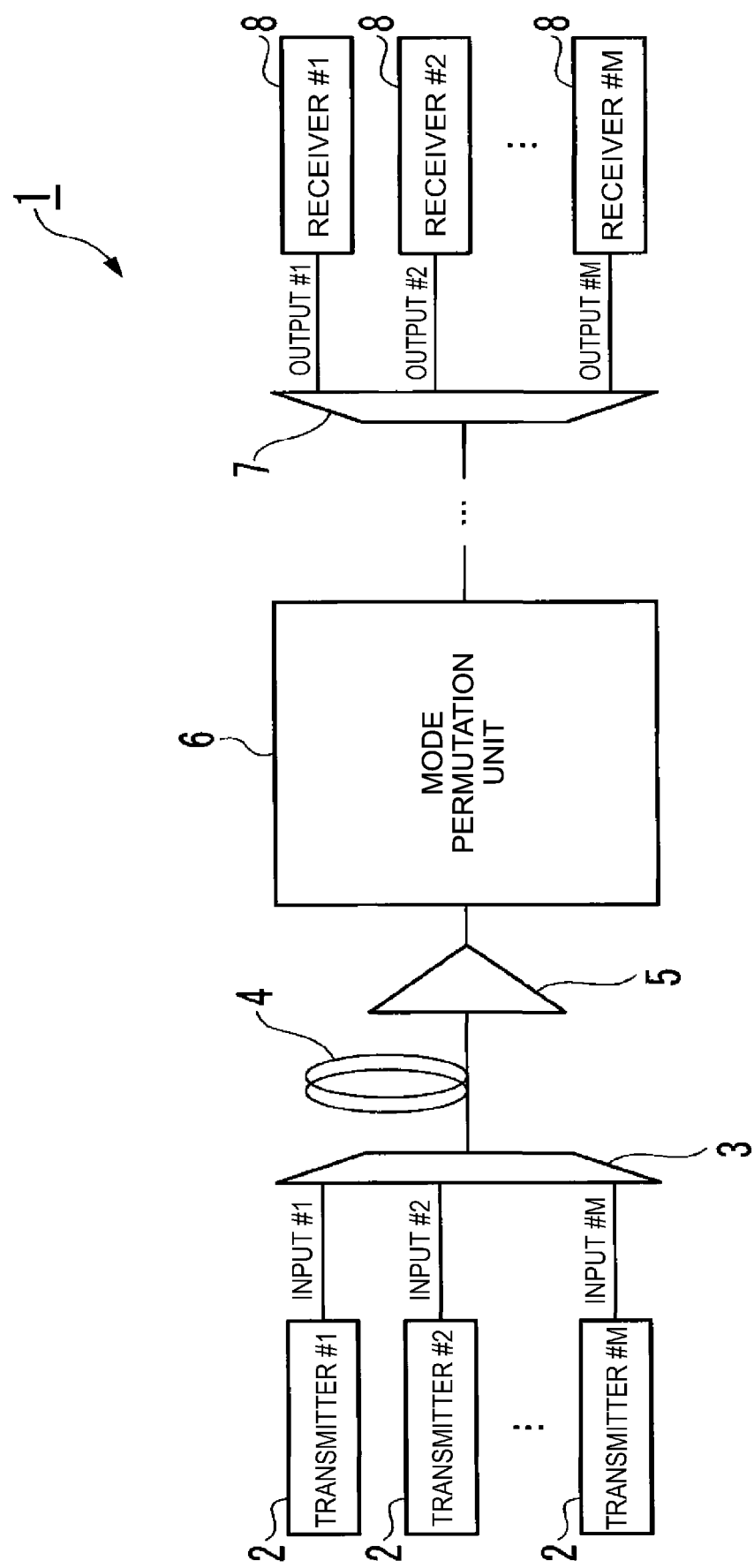
FIG. 1 is a configuration diagram of a multi-mode optical fiber system in a first embodiment.

FIG. 1 is a configuration diagram of a multi-mode optical fiber system 1 in a first embodiment of the present invention. A multi-mode optical fiber system 1 includes a transmitter 2, a mode multiplexer-demultiplexer 3, a multi-mode optical amplifier 5, a mode permutation unit 6, a mode multiplexer-demultiplexer 7, and a receiver 8.

The multi-mode optical fiber system 1 includes M (M is an integer of one or more) each of the transmitters 2 and the receivers 8. An mth (m is an integer of 1 or more and M or less) transmitter 2 and an mth receiver 8 will be referred to as a transmitter #m and a receiver #m.

The multi-mode optical fiber system 1 includes one or more multi-mode optical amplifiers 5 and one or more mode permutation units 6 between the mode multiplexer-demultiplexer 3 and the mode multiplexer-demultiplexer 7. The figure shows a case where one mode permutation unit 6 is connected to the subsequent stage of one multi-mode optical amplifier 5, but two or more multi-mode optical amplifiers 5 may be connected consecutively, or two or more mode permutation units 6 may be connected consecutively. The multi-mode optical amplifier 5 and the mode permutation unit 6 are connected to adjacent equipment (mode multiplexer-demultiplexer 3, multi-mode optical amplifier 5, mode permutation unit 6, or mode multiplexer-demultiplexer 7) by multi-mode fiber 4. One span is from the multi-mode fiber 4, connected to the mode multiplexer-demultiplexer 3 or the mode permutation unit 6, to the next mode permutation unit 6.

The multi-mode fiber 4 to be a transmission path is, for example, optical fiber having a single core. The multi-mode fiber 4 excites M modes in a wavelength band used. Each of a transmitter #1 to a transmitter #M converts an independent data series to be input into each mode to a single-mode optical signal. An optical signal input from the transmitter #m (m is an integer of 1 or more and M or less) into the mode multiplexer-demultiplexer 3 in a single mode will be referred to as an input #m. Into the mode multiplexer-demultiplexer 3, an input #1 to an input #M are input respectively from the transmitters #1 to the transmitter #M.

The mode multiplexer-demultiplexer 3 outputs a mode multiplexing signal obtained by multiplexing the input #1 to the input #M by using different types of modes, and the output mode multiplexing signal is input into the multi-mode fiber 4. The multi-mode optical amplifier 5 compensates, through an optical amplification process, the attenuation of the optical power of the mode multiplexing signal generated during the transmission in the multi-mode fiber 4. The mode multiplexing signal after the compensation is input into the mode permutation unit 6.

Next, the operation of the mode permutation unit 6 will be described using an example of cyclic permutation. The respective mode signals having constituted the input mode multiplexing signal, input into the mode permutation unit 6, are labeled as an output #1 to an output #M, and the respective mode signals constituting the mode multiplexing signal to be output from the mode permutation unit 6 are labeled as an input #1 to an input #M. When the output #m and the input #m use an mth-type mode of M types of modes, the mode permutation unit 6 performs cyclic permutation shown in formula (1) on an output #p and an input #q (p, q are integers 1 or more and M or less).

$$q = p + 1 \pmod{M} \tag{1}$$

The above is the operation in the transmission of a first span. The same form of transmission is also performed in the next span and thereafter. After being transmitted a predetermined number of spans, the mode multiplexing signal is input into the mode multiplexer-demultiplexer 7. The mode multiplexer-demultiplexer 7 converts the input mode multiplexing signal to the output #1 to the output #m that are M single-mode optical signals.

The mode multiplexer-demultiplexer 7 outputs the output #m to the receiver #m. A receiver#1 to a receiver #M respectively convert the outputs #1 to #M of the single-mode optical signals to information of the original data series.

When a power coupling process associated with the mode conversion is performed during the mode multiplexing transmission, multiple-input multiple-output (MIMO) signal processing may be performed among the receiver #1 to the receiver #M, but the description thereof is omitted here for simplicity.

In the above, each transmitter 2 has been described using the example of outputting a single-wavelength signal, but each transmitter 2 used in the present embodiment is not limited to the form of outputting a single-wavelength signal. That is, the effect of the present embodiment remains unchanged even with the use of a transmitter that outputs a plurality of wavelength signals in the multi-mode optical fiber system 1.

In the above, the example has been used where the cyclic permutation represented by formula (1) is performed between the input-output of a pair of the mode multiplexer-demultiplexer 3 and the mode multiplexer-demultiplexer 7, but in the present embodiment, the relationship between the input-output of the pair of the mode multiplexer-demultiplexer 3 and the mode multiplexer-demultiplexer 7 is not limited to formula (1). That is, the relationship between the input-output of the pair of the mode multiplexer-demultiplexer 3 and the mode multiplexer-demultiplexer 7 is not limited but is effective in any permutation. That is, the mode permutation unit 6 may only permutate the mode so that an optical signal of a pth-type (p is an integer of 1 or more and M or less) mode in the input mode multiplexing signal becomes a signal of a qth-type (q is an integer of 1 or more and M or less) mode in the output mode multiplexing signal. In addition, some modes may not be permutated in the mode permutation unit 6.

In the present embodiment, the signals constituting the mode multiplexing signal have been labeled with the numbers of 1 to M, but these also include a so-called polarization mode and degradation mode. For example, in fiber that excites two linear-polarization (LP) modes, each of LP01X, LP01Y, LP11aX, LP11aY, LP11bX, and LP11bY, including the degradation mode, can be used as a carrier mode of an independent signal, but the modes described in the present application mean that each one of these modes is to be discriminated and treated.

Second Embodiment

In a second embodiment, as an embodiment of the mode permutation unit 6 described in the first embodiment, a configuration in which two mode multiplexers-demultiplexers are combined will be described.

Figure 2:
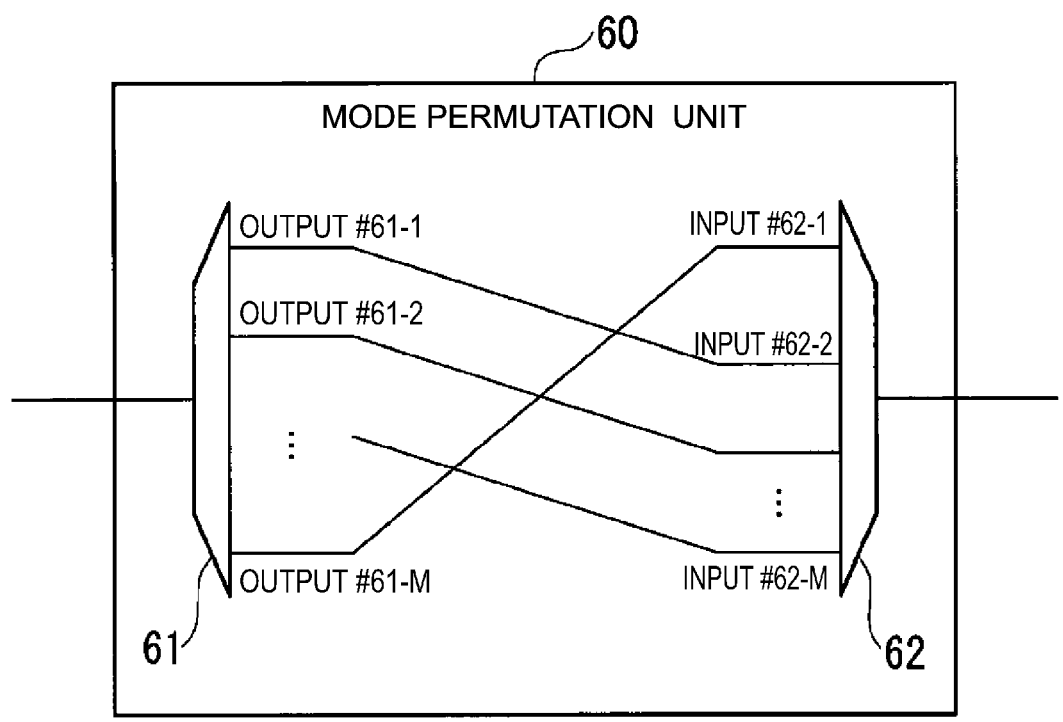
FIG. 2 is a configuration diagram of a mode permutation unit in a second embodiment.

FIG. 2 is a schematic block diagram showing a configuration of a mode permutation unit 60 in the second embodiment of the present invention. The mode permutation unit 60 is used as a mode permutation unit 6 of the first embodiment. The mode permutation unit 60 includes an input-side mode multiplexer-demultiplexer 61 and an output-side mode multiplexer-demultiplexer 62.

The mode multiplexer-demultiplexer 61 inputs a mode multiplexing signal transmitted through the multi-mode fiber 4, and converts the input mode multiplexing signal to M single-mode optical signals. These single-mode optical signals are labeled with an output #61-1 to an output #61-M. An output #61-*m* (m is an integer of 1 or more and M or less) is a single-mode optical signal converted from an mth-type mode of M modes in the mode multiplexing signal. The mode multiplexer-demultiplexer 61 has M output units (not shown) and outputs the output #61-*m* from an mth output unit.

Single-mode optical signals which are input into the output-side mode multiplexer-demultiplexer 62 are labeled as an input #62-1 to an input #62-M, respectively. The mode multiplexer-demultiplexer 62 has M input units (not shown) corresponding to the respective modes, and inputs an input #62-*m* from an mth (m is an integer of 1 or more and M or less) input unit. The input #62-*m* is converted to the mth-type mode of the M modes in the mode multiplexing signal.

The mode multiplexer-demultiplexer 61 inputs the output #61-1 into the mode multiplexer-demultiplexer 62 as an input #62-2. In the following, in the same manner as above, an output #61-*p* is permutated by an input #62-*q* in accordance with the relationship of formula (1) described in the first embodiment. The mode multiplexer-demultiplexer 62 again converts the permutated input #62-1 to input #62-M to a mode multiplexing signal, and transmits the converted mode multiplexing signal to the multi-mode fiber 4 that is an output-side optical transmission path.

Although the description has been made using the example of the cyclic permutation in the present embodiment as well, the present embodiment is not limited to the cyclic permutation. The mode multiplexer-demultiplexer 61 inputs the output #61-*p* (p is an integer of 1 or more and M or less) into the mode multiplexer-demultiplexer 62 as the input #62-*q* (q≠p, q is an integer of 1 or more and M or less).

In addition, some modes may not be permutated in the mode permutation unit 60. When the mode permutation is not performed, the mode multiplexer-demultiplexer 61 inputs the output #61-$p$ into the mode multiplexer-demultiplexer 68 as an input #62-$p$.

Third Embodiment

In a third embodiment, as an embodiment of the mode permutation unit 6 described in the first embodiment, a configuration will be described where two mode multiplexers-demultiplexers are combined and an M×M switch is further provided.

Figure 3:
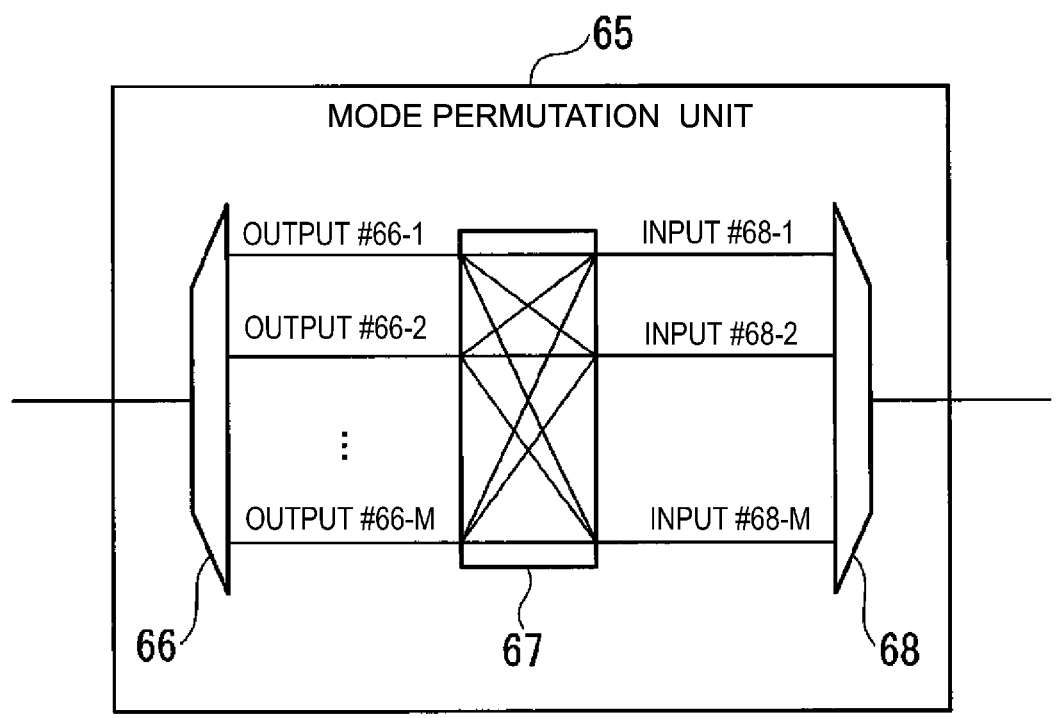
FIG. 3 is a configuration diagram of a mode permutation unit in a third embodiment.

FIG. 3 is a configuration diagram of a mode permutation unit 65 in a third embodiment of the present invention. The mode permutation unit 65 is used as the mode permutation unit 6 of the first embodiment. The mode permutation unit 65 includes an input-side mode multiplexer-demultiplexer 66, an M×M switch 67, and an output-side mode multiplexer-demultiplexer 68.

The mode multiplexer-demultiplexer 66 inputs a mode multiplexing signal transmitted through the multi-mode fiber 4, and converts the input mode multiplexing signal to M single-mode optical signals. These single-mode optical signals are labeled with an output #66-1 to an output #66-M. An output #66-$m$ ($m$ is an integer of 1 or more and M or less) is a single-mode optical signal converted from an mth-type mode of M modes in the mode multiplexing signal. The mode multiplexer-demultiplexer 66 has M output units (not shown) and outputs the output #66-$m$ from an mth output unit.

Single-mode optical signals which are input into the output-side mode multiplexer-demultiplexer 68 are labeled as an input #68-1 to an input #68-M, respectively. The mode multiplexer-demultiplexer 68 has M input units (not shown) corresponding to the respective modes, and inputs an input #68-$m$ from an mth ($m$ is an integer of 1 or more and M or less) input unit. The input #68-$m$ is converted to the mth-type mode of the M modes in the mode multiplexing signal.

The M×M switch 67 is inserted between the multiplexer-demultiplexer 66 and the e mode multiplexer-demultiplexer 68. The M×M switch 67 arbitrarily permutates the label number of any input-output. For example, the M×M switch 67 performs any permutation that satisfies the relationship of formula (1) concerning p and q of an output #66-$p$ and an input #68-$q$. The mode multiplexer-demultiplexer 68 again converts the input #68-1 to input #68-M, permutated in the M×M switch 67, to a mode multiplexing signal and transmits the converted mode multiplexing signal to the multi-mode fiber 4 that is an output-side optical transmission path. Note that some modes in the mode permutation unit 65 may not be permutated. The M×M switch 67 inputs an output #66-$p$ ($p$ is an integer of 1 or more and M or less) to be subjected to the mode permutation into the mode multiplexer-demultiplexer 68 as the input #68-$q$ ($q$ #$p$, q is an integer of 1 or more and M or less), and inputs the output #66-$p$ not to be subjected to the mode permutation into the mode multiplexer-demultiplexer 68 as the input #68-$p$.

Fourth Embodiment

Figure 4:
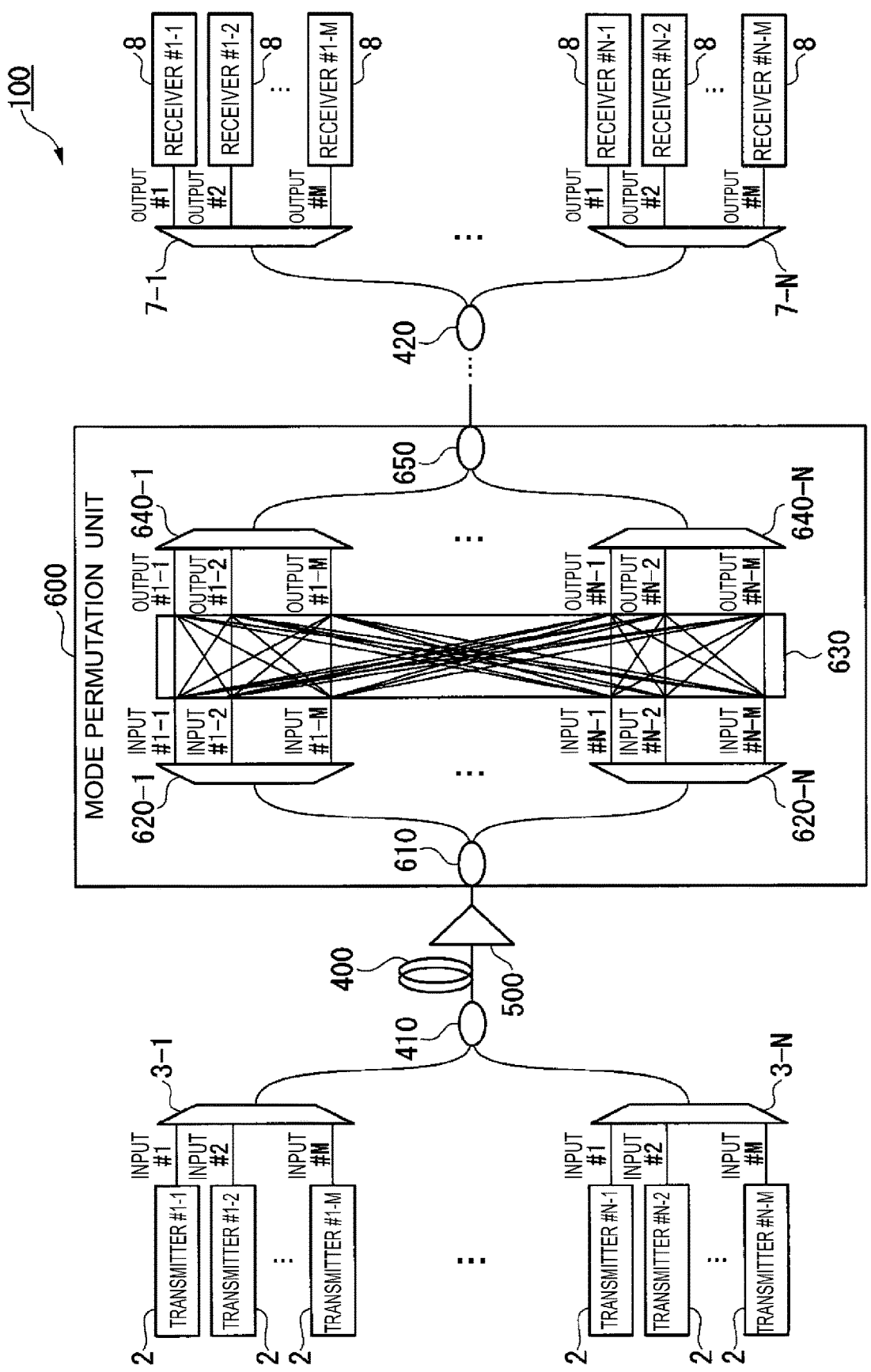
FIG. 4 is a configuration diagram of a multi-core multi-mode optical fiber system in a fourth embodiment.

FIG. 4 is a configuration diagram of a multi-core multi-mode optical fiber system 100 in a fourth embodiment of the present invention. In the fourth embodiment, a multi-core multi-mode fiber 400 is used as transmission-path fiber. The multi-core multi-mode fiber 400 is optical fiber having N (N is an integer of 2 or more) cores, and each core excites M modes.

The multi-core multi-mode optical fiber system 100 includes a transmitter 2, a mode multiplexer-demultiplexer 3, a fan-in 410, a multi-core multi-mode optical amplifier 500, a mode permutation unit 600, a fan-out 420, a mode multiplexer-demultiplexer 7, and a receiver 8. The multi-core multi-mode optical fiber system 100 includes N each of the mode multiplexers-demultiplexers 3 and the mode multiplexers-demultiplexers 7, and an nth (n is an integer of 1 or more and N or less) mode multiplexer-demultiplexer 3 and an nth mode multiplexer-demultiplexer 7 will be referred to as a mode multiplexer-demultiplexer 3-$n$ and a mode multiplexer-demultiplexer 7-$n$. M transmitters 2 connected to the mode multiplexer-demultiplexer 3-$n$ will be referred to as a transmitter #n-1 to a transmitter #n-M, and M receivers 8 connected to the mode multiplexer-demultiplexer 7-$n$ will be referred to as a receiver #n-1 to a receiver #n-M.

The multi-core multi-mode optical fiber system 100 includes one or more multi-core multi-mode optical amplifier 500 and one or more mode permutation units 600 between the fan-in 410 and the fan-out 420. The figure shows a case where one mode permutation unit 600 is connected to the subsequent stage of one multi-core multi-mode optical amplifier 500, but two or more multi-core multi-mode optical amplifiers 500 may be connected consecutively, or two or more mode permutation units 600 may be connected consecutively. The multi-core multi-mode optical amplifier 500 and the mode permutation unit 600 are connected to adjacent equipment (fan-in 410, multi-core multi-mode optical amplifier 500, mode permutation unit 600, or fan-out 420) by the multi-core multi-mode fiber 400. One span is from the multi-core multi-mode fiber 400, connected to the fan-in 410 or the mode permutation unit 600, to the next mode permutation unit 600.

The transmitter #n-1 to the transmitter #n-M and the mode multiplexer-demultiplexer 3-$n$ generate a mode multiplexing signal to be input into an nth core of the multi-core multi-mode fiber 400. Specifically, the transmitter #n-1 to the transmitter #n-M each convert an independent data series to be input into each mode of the nth core to a single-mode optical signal. The optical signal input in a single mode from the transmitter #n-M into the mode multiplexer-demultiplexer 3-$n$ will be referred to as an input #m. The mode multiplexer-demultiplexer 3-$n$ outputs a mode multiplexing signal obtained by multiplexing the inputs #1 to #M input from the transmitter #n-1 to the transmitter #n-M, respectively.

The fan-in 410 inputs the mode multiplexing signal generated by each of the mode multiplexer-demultiplexer 3-1 to 3-N and loads the optical signal into the multi-core multi-mode fiber 400. At this time, the fan-in 410 outputs the mode multiplexing signal, input from the mode multiplexer-demultiplexer 3-$n$, to the nth core of the multi-core multi-mode fiber 400.

Subsequently, through an optical amplification process, the multi-core multi-mode optical amplifier 500 compensates the mode multiplexing signal for the attenuation of an optical power generated during the transmission in the multi-core multi-mode fiber 400. The mode multiplexing signal having propagated through the multi-core multi-mode fiber 400 is then input into the mode permutation unit 600.

The mode permutation unit 600 includes a fan-out 610, N mode multiplexers-demultiplexers 620, an NM×NM switch 630, N mode multiplexers-demultiplexers 640, and a fan-in 650. The N mode multiplexers-demultiplexers 620 will be referred to as mode multiplexers-demultiplexers 620-1 to 620-N, respectively, and the N mode multiplexers-demultiplexers 640 will be referred to as mode multiplexers-demultiplexers 640-1 to 640-N, respectively The mode multiplexer-demultiplexer 620 and the mode multiplexer-demultiplexer 640 have the same functions as the mode multiplexer-demultiplexer 66 and the mode multiplexer-demultiplexer 68 of the third embodiment, respectively.

The operation of the mode permutation unit 600 will be described. The respective M mode signals having constituted the mode multiplexing signal, input into the mode permutation unit 600 after being transmitted through the nth core of the multi-core multi-mode fiber 400, are labeled as an input #n-1 to an input #n-M, and the respective M mode signals constituting the mode multiplexing signal, which is output from the mode permutation unit 600 to the nth core of the multi-core multi-mode fiber 400, are labeled as an output #n-1 to an output #n-M.

The fan-out 610 inputs the mode multiplexing signal, transmitted through the nth core of the multi-core multi-mode fiber 400, into a mode multiplexer-demultiplexer 620-n. The mode multiplexer-demultiplexer 620-n divides the mode multiplexing signal into the output #n-1 to the output #n-M, which are M single-mode optical signals, and inputs the divided outputs into the NM×NM switch 630.

The NM×NM switch 630 performs predetermined permutation for any input #p and output #q (p, q is 1-1 to N-M). That is, the NM×NM switch 630 outputs inputs #n-m to any of output destinations of an output #1-1 to an output #N-M so that the output destination of each of an input #1-1 to an input #N-M is different. A mode multiplexer-demultiplexer 640-n inputs the output #n-1 to the output #n-M and outputs a mode multiplexing signal obtained by multiplexing the output #n-1 to the output #n-M to the fan-in 650. The fan-in 650 inputs the mode multiplexing signals from the mode multiplexers-demultiplexers 640-1 to 640-N and loads the input mode multiplexing signals into the multi-core multi-mode fiber 400. That is, the fan-in 650 inputs the mode multiplexing signal input from the mode multiplexer-demultiplexer 640-n into the nth core of the multi-core multi-mode fiber 400.

The above is the operation in the transmission of a first span. The same form of transmission is also performed in the next span and thereafter. After being transmitted a predetermined number of spans, the mode multiplexing signal is divided into N mode multiplexing signals by the fan-out 420. The fan-out 420 outputs the mode multiplexing signal, having propagated through the nth core of the multi-core multi-mode fiber 400, to the mode multiplexer-demultiplexer 7-n. The mode multiplexer-demultiplexer 7-n converts the mode multiplexing signal, output from the fan-out 420 to the output #1 to the output #m that are the M single-mode optical signals. The mode multiplexer-demultiplexer 7-n outputs the output #m to the receiver #n-m. The receiver #n-1 to the receiver #n-M convert the output #1 to the output #M of the single-mode optical signals to the information of the original data series.

Fifth Embodiment

Figure 5:
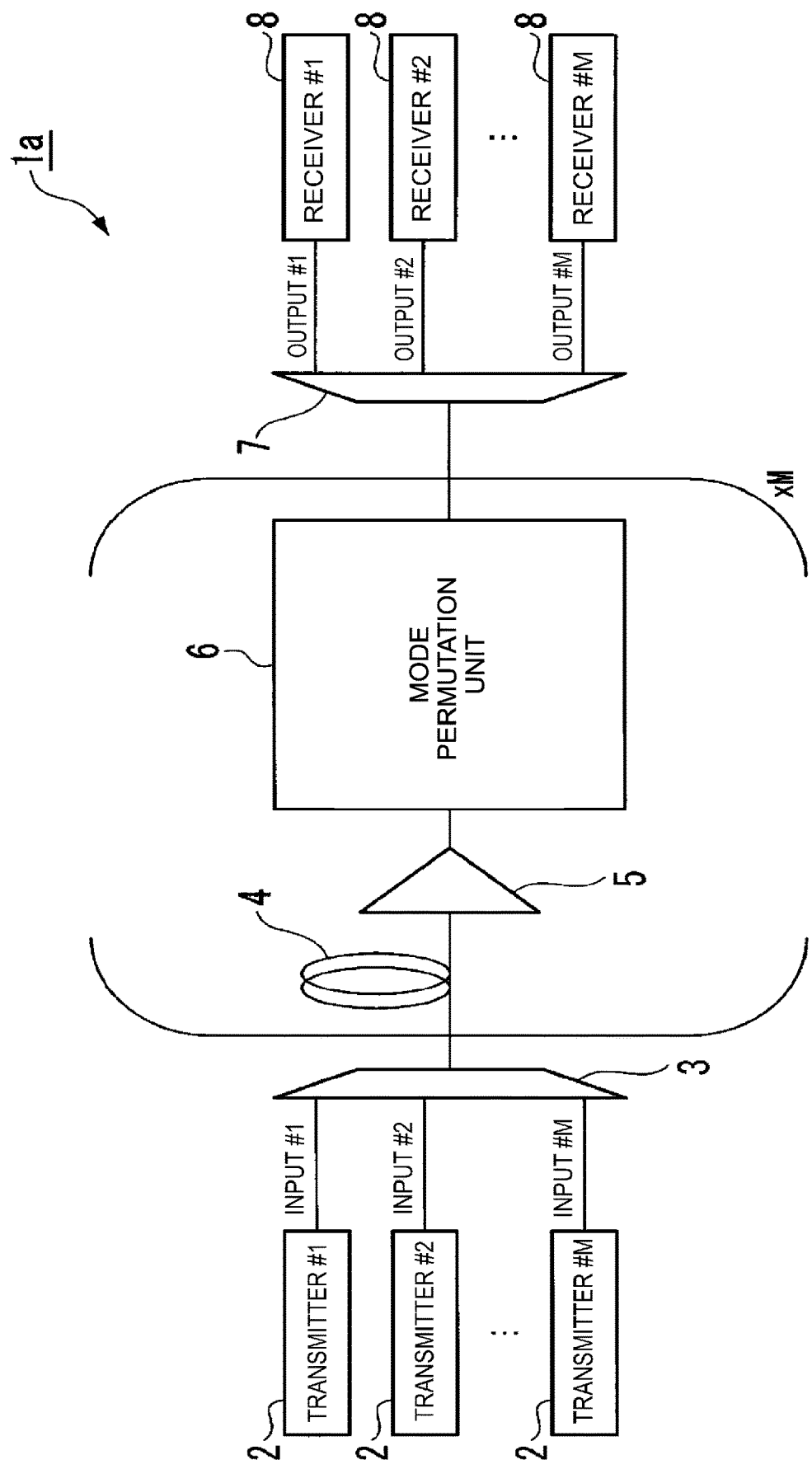
FIG. 5 is a configuration diagram of a multi-mode optical fiber system in a fifth embodiment.

FIG. 5 is a configuration diagram of a multi-mode optical fiber system 1a in a fifth embodiment of the present invention. In the figure, the portions identical to those in the multi-mode optical fiber system 1 according to the first embodiment, shown in the figure, are provided with the identical reference numerals, and the description thereof will be omitted. The fifth embodiment is different from the first embodiment in that a number L of spans is designed to be equal to a number M of excitation modes of the transmission-path fiber.

In the fifth embodiment, the permutation to be performed in the mode permutation unit 6 is performed by cyclic permutation, for example. At this time, a signal pulse after the transmission of M spans propagates through the optical transmission path as an optical signal of all excitation modes, which enables effective reduction in the deviation of the signal quality that occurs among the original modes. That is, the optical signal experiences all the excitation modes, thus reducing the influence of a mode-dependent loss where only a specific mode is attenuated selectively.

Note that each of the functional units, which are the mode multiplexer-demultiplexer, a connection with the multi-mode fiber or the multi-core multi-mode fiber, and the switch unit (e.g., N×N switch, NM×NM switch), constituting the mode permutation unit 6, 60, 65, 600 according to each of the first to fifth embodiments, is similarly effective in the effect of the present embodiment regardless of its form so long as having a function of permutation each mode signal that constitutes the mode multiplexing signal. For example, the configurations of the mode multiplexer-demultiplexer and the connection include a waveguide type, a plana optical wave circuit type, a tapered type, a spatial optical type, and a fiber grating type, and the switch unit includes configurations of a type of a micro-electro-mechanical systems (MEMS) and a type of a liquid crystal on silicon (LCoS), but these are not restrictive.

The mode permutation unit 6, 60, 65, 600 may be implemented in combination with another device or optical amplifier. For example, by providing the function of the mode permutation unit 6, 60, 65, 600 in a pump combiner unit of the optical amplifier, the same effect as the present embodiment can be obtained.

A simulation was performed in order to confirm the effect of the second embodiment.

Figure 6:
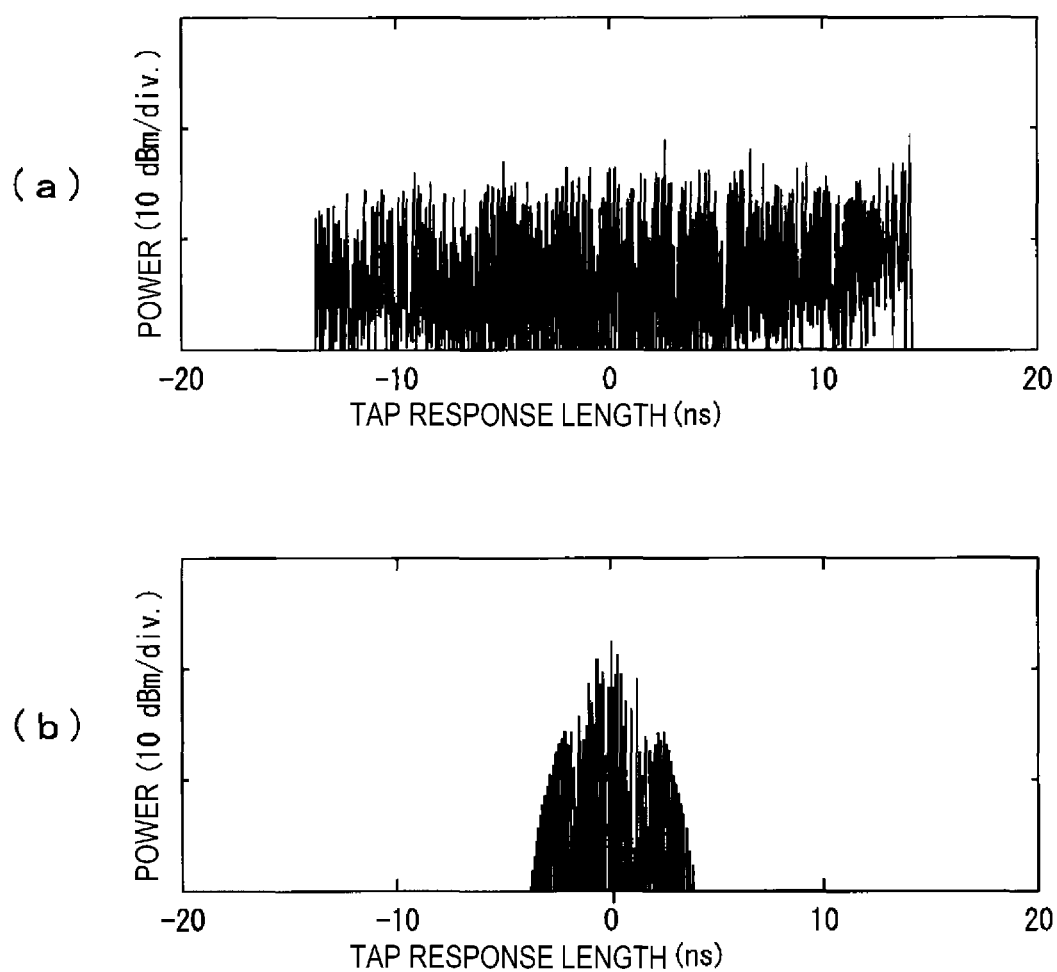
FIGS. 6(a) and 6(b) show simulation results of the second embodiment.

FIGS. 6(a) and 6(b) show the results of the simulation. In the simulation, a 100-span multi-mode transmission path that transmits two LP modes was assumed.

Then, a state where pulse power of an LP01 mode, input into the multi-mode transmission path, disperses in the time direction is confirmed, and the states before and after the application of the second embodiment were compared. It was assumed that each span has random mode dispersion between 0.1 n second and 0.5 n second, and further, the power coupling between modes occurs associated with mode conversion of 15 dB between the LP01 mode and an LP11 mode per span.

FIG. 6(a) shows the simulation result before the application of the second embodiment, and FIG. 6(b) shows the simulation result after the application of the second embodiment.

Before the application of the second embodiment shown in FIG. 6(a), the pulse power of the LP01 mode spreads about 30 n seconds.

On the other hand, after the application of the second embodiment shown in FIG. 6(b), the spread of pulse power of the LP01 mode has been reduced to about 10 n seconds. As thus described, the use of the present embodiment enables significant reduction in the spread of a signal pulse due to mode dispersion that accumulates in accordance with a transmission distance.

According to the above embodiment, the optical transmission system includes a plurality of transmission paths that transmit a mode multiplexing signal, and one or more mode permutation units provided between the transmission paths. The optical transmission system is, for example, the multi-mode optical fiber system 1, 1*a*, or a multi-core multi-mode optical fiber system 100. The mode permutation unit performs mode permutation to interchange modes to be used among some or all optical signals of the respective optical signals of a plurality of types of modes that are multiplexed to a mode multiplexing signal input from the transmission path on the input side, and outputs the mode multiplexing signal subjected to the mode permutation to the transmission path on the output side.

The mode permutation unit may be configured to include a mode demultiplexing unit and a mode multiplexing unit. For example, the mode demultiplexing unit is the mode multiplexer-demultiplexer 61, and the mode multiplexing unit is the mode multiplexer-demultiplexer 62. The mode demultiplexing unit divides an optical signal of each of a plurality of types of modes, which are multiplexed to the mode multiplexing signal input from the transmission path, into an optical signal of a single mode. The mode multiplexing unit inputs the optical signal of the single mode from each of the input units corresponding to the plurality of types of modes, and outputs to the transmission path on the output side a mode multiplexing signal obtained by multiplexing a plurality of optical signals input from the respective input units by using modes that correspond to the input units The mode demultiplexing unit outputs each of the divided optical signals to the input unit corresponding to the mode after the mode permutation of the optical signal.

The mode permutation unit may be configured to include a mode demultiplexing unit, a mode multiplexing unit, and a switch unit. For example, the mode demultiplexing unit is the mode multiplexer-demultiplexer 66, the mode multiplexing unit is the mode multiplexer-demultiplexer 68, and the switch unit is the M×M switch 67. In this case, the mode demultiplexing unit outputs the divided optical signals to the switch unit. The switch unit outputs each of a plurality of optical signals divided by the mode demultiplexing unit to the input unit corresponding to the mode after the mode permutation of the optical signal.

The transmission path may be single-core fiber (e.g., multi-mode fiber 4) or may be multi-core fiber (e.g., multi-core multi-mode fiber 400). When the transmission path is the multi-core fiber, the mode permutation unit is configured to include a mode demultiplexing unit, a mode multiplexing unit, and a switch unit.

For example, the mode permutation unit is the mode permutation unit 600, the mode demultiplexing unit is the fan-out 610 and mode multiplexers-demultiplexers 620-1 to 620-N, the mode multiplexing unit is mode multiplexers-demultiplexers 640-1 to 640-N and the fan-in 650, and the switch unit is the NM×NM switch 630. The mode demultiplexing unit divides an optical signal of each of a plurality of types of modes multiplexed to the mode multiplexing signal, transmitted through each of a plurality of cores of the multi-core fiber, into an optical signal of a single mode. The mode multiplexing unit inputs the optical signal of the single mode from each of input units corresponding to each of combinations of a plurality of cores of the multi-core fiber of the output destination and the plurality of types of modes, generates the next mode multiplexing signal, and outputs the generated mode multiplexing signal to the corresponding core of the output-side multi-core fiber.

a mode multiplexing signal obtained by multiplexing a plurality of optical signals input from the respective input units by using modes that correspond to the input units, for each core of the output-side multi-core fiber of the output destination.

The switch unit outputs each of a plurality of optical signals divided by the mode demultiplexing unit to the input unit of the mode multiplexing unit corresponding to the core of the output destination and the mode after the mode permutation.

According to the embodiments described above, it is possible to transmit an optical signal over a long distance stably with a small number of errors.

Although the embodiments of the present invention have been detailed above with reference to the drawings, concrete configurations are not limited to these embodiments but also includes design or the like in a range not deviating from the gist of the present invention.

INDUSTRIAL AVAILABILITY

The present invention is applicable to a communication system that transmits an optical signal with multiplied modes.

REFERENCE SIGNS LIST

1, 1*a* multi-mode optical fiber system
2 transmitter
3, 3-1 to 3-N, 7, 7-1 to 7-N, 61, 62, 66, 68, 620-1 to 62-N, 640-1 to 640-N mode multiplexer-demultiplexer
4 multi-mode fiber
5 multi-mode optical amplifier
6, 60, 65 mode permutation unit
8 receiver
67 M×M switch
100 multi-core multi-mode optical fiber system
400 multi-core multi-mode fiber
410, 650 fan-In
420, 610 fan-out
500 multi-core multi-mode optical amplifier
630 NM×NM switch

The invention claimed is:

1. An optical transmission system comprising:
a plurality of transmission paths that transmit a mode multiplexing signal; and
a plurality of mode permutation units provided between the transmission paths,
wherein the mode permutation unit performs mode permutation to interchange modes to be used between at least some optical signals among respective optical signals of a plurality of types of modes that are multiplexed to the mode multiplexing signal input from the transmission path on an input side, and outputs the mode multiplexing signal subjected to the mode permutation to the transmission path on an output side, and
the mode of each of a plurality of the optical signals multiplexed to the mode multiplexing signal is cyclically permutated by a same number of the mode permutation units as a number of types of the modes.

2. The optical transmission system according to claim 1, wherein
the mode permutation unit includes
a mode demultiplexing unit that divides into a single mode an optical signal of each of a plurality of types of the modes that are multiplexed to the mode multiplexing signal input from the transmission path on the input side, and
a mode multiplexing unit that inputs the optical signal of the single mode from each of the input units corresponding to the plurality of types of the modes, and outputs to the transmission path on the output side a mode multiplexing signal obtained by multiplexing a plurality of the optical signals input from the respective input units by using modes that correspond to the input units, and the mode demultiplexing unit outputs each of the divided optical signals to the input unit corresponding to the mode after the mode permutation of the optical signal.

3. The optical transmission system according to claim 1, wherein the mode permutation unit includes a mode demultiplexing unit that divides into a single mode an optical signal of each of a plurality of types of the modes that are multiplexed to the mode multiplexing signal input from the transmission path on the input side, a mode multiplexing unit that inputs the optical signal of the single mode from each of the input units corresponding to the plurality of types of the modes, and outputs to the transmission path on the output side a mode multiplexing signal obtained by multiplexing a plurality of the optical signals input from the respective input units by using modes that correspond to the input units, and switch unit that outputs each of the plurality of the optical signals divided by the mode demultiplexing unit the input unit corresponding to the mode after the mode permutation of the optical signal.

4. The optical transmission system according to claim 1, wherein the transmission path is single-core fiber.

5. An optical transmission method in an optical transmission system that includes a plurality of transmission paths that transmit a mode multiplexing signal, and a plurality of mode permutation units provided between the transmission paths, the method comprising:

a mode permutation step to perform mode permutation to interchange modes to be used between at least some optical signals among respective optical signals of a plurality of types of modes that are multiplexed to the mode multiplexing signal input from the transmission path on an input side, and to output the mode multiplexing signal subjected to the mode permutation to the transmission path on an output side, wherein the mode of each of a plurality of the optical signals multiplexed to the mode multiplexing signal is cyclically permutated by a same number of the mode permutation units as a number of types of the modes performing the mode permutation step.

6. An optical transmission system comprising:

a plurality of transmission paths that transmit a mode multiplexing signal; and one or more mode permutation units provided between the transmission paths, wherein the mode permutation unit performs mode permutation to interchange modes to be used between at least some optical signals among respective optical signals of a plurality of types of modes that are multiplexed to the mode multiplexing signal input from the transmission path on an input side, and outputs the mode multiplexing signal subjected to the mode permutation to the transmission path on an output side, the transmission path is multi-core fiber, and the mode permutation unit includes a plurality of mode demultiplexing units, each provided corresponding to a different first core out of a plurality of first cores of the multi-core fiber on an input side, that divide an optical signal of each of a plurality of types of the modes multiplexed to the mode multiplexing signal transmitted through the corresponding first core into single modes, a fan-out that inputs the mode multiplexing signals, each transmitted through the different first cores of the multi-mode fiber on the input side, into the mode demultiplexing units corresponding to the first core through which the mode multiplexing signal transmitted, a plurality mode multiplexing units, each provided corresponding to a different second core out of a plurality of second cores of the multi-core fiber on an output side, that generate a mode multiplexing signal obtained by multiplexing the plurality of optical signals input from respective input units, each of the input units corresponding to different types of the modes, by using modes that correspond to the input units, respectively, and output the generated mode multiplexing signal, a fan-in that inputs the each of mode multiplexing signals from the mode multiplexing units into the second core corresponding to the mode multiplexing unit that outputs the multiplexing signal out of the second cores of the multi-core fiber on the output side, and a switch unit that outputs each of the plurality of the optical signals divided by each of the plurality of the mode demultiplexing units to the input unit corresponding to the mode after the mode permutation out of the input units of the mode multiplexing unit corresponding to the second core that is an output destination of the optical signal.

* * * * *